Jan. 1, 1929.
B. D. RITHOLZ
EYE TESTING DEVICE
Filed May 13, 1927
1,697,205
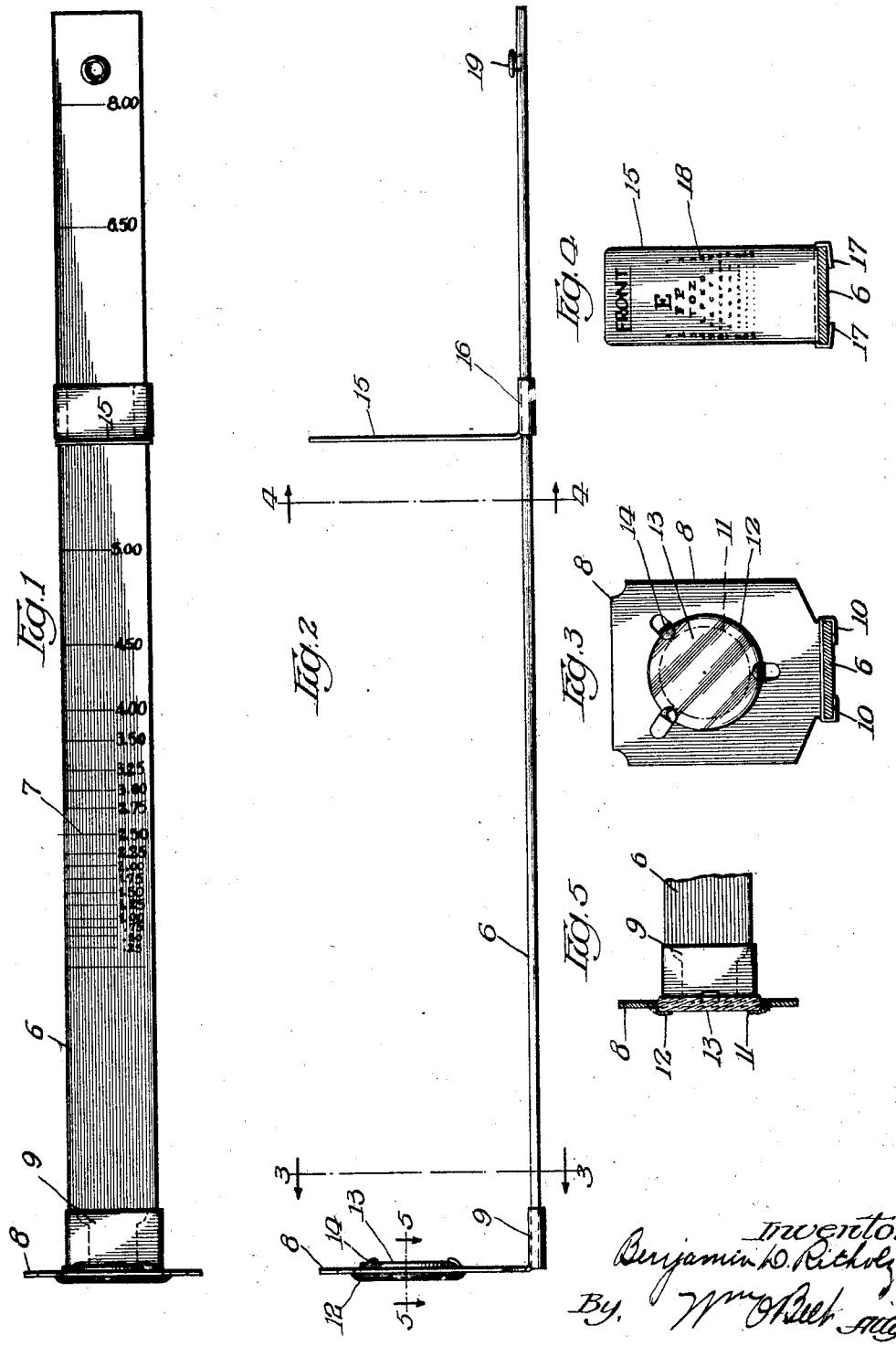

Patented Jan. 1, 1929.

1,697,205

UNITED STATES PATENT OFFICE.

BENJAMIN D. RITHOLZ, OF CHICAGO, ILLINOIS, ASSIGNOR TO NATIONAL WATCH & JEWELRY CO., OF CHICAGO, ILLINOIS, A CORPORATION OF ILLINOIS.

EYE-TESTING DEVICE.

Application filed May 13, 1927. Serial No. 191,022.

This invention relates to eye testing devices and its object is to provide a novel device of simple but strong and substantial construction which can be easily operated for testing eyes so that any individual may be determine the information necessary to enable an optician to make the proper lenses for correcting defects of sight.

And a further object of the invention is to provide an eye testing device of compact form which is adapted for transmission through the mails and which can be produced at relatively low cost so that it can be furnished without charge to individuals for testing their own eyes and which will stand repeated shipment for this purpose.

In the accompanying drawings illustrating the invention:

Fig. 1 is a top plan view.
Fig. 2 is a side elevation.
Fig. 3 is a sectional view on the line 3—3 of Fig. 2.
Fig. 4 is a sectional view on the line 4—4 of Fig. 2.
Fig. 5 is a transverse sectional view through the eye member on the line 5—5 of Fig. 2.

Referring to the drawings 6 is a slide or scale bar provided on its top face with a scale 7 graduated by lines and figures. This bar consists of an elongated strip made of wood or other suitable material.

The eye member 8 is rigidly mounted on one end of the slide bar and it consists of a single strip of sheet metal having its lower end bent rearward at right angles to form a clamp 9 which includes flanges 10 engaging the underside of the slide bar to secure the eye member rigidly upon the slide bar at one end thereof. The eye member has an opening 11 and the edge margin 12 of this opening is bent to form an annular seat to receive the lens 13 which is secured in its seat by lips 14 struck up from the eye member strip and bent over and upon the back of the lens. Thus the lens is securely and rigidly held in place on the eye member strip and the eye member is rigidly clamped on the slide bar.

The chart member 15 consists of a metal strip which has its lower end bent rearward at right angles to form a guide 16 having bottom flanges 17 which embrace the side edge margins of the slide bar. The chart member projects upward from the top face of the slide bar parallel with the eye member and at right angles to the slide bar, and it is provided on the front thereof with a suitable eye chart 18 in alignment with the lens in the eye member. I prefer to use the lens, but it may be omitted if desired. A stop 19 is provided on the slide bar to retain the chart member thereon.

The invention provides a novel eye testing device of strong and substantial but simple construction which can be used by any individual for testing his eye sight, to ascertain such facts from the chart and the scale as may be necessary to enable an optician to provide proper lenses.

I claim:

An eye testing device comprising a slide bar, an eye member secured to one end of the slide bar, and a chart member slidably mounted on the slide bar and in parallel relation with the eye member, said eye member comprising a metal strip bent rearward at its lower end and provided with flanges forming a clamp to receive and secure the eye member rigidly in place on the slide bar, said strip having an opening therein and the edge margin of said opening bent to form a seat, a lens arranged in said seat over said opening, and lips struck up from the strip and bent over the lens to hold it in said seat.

BENJAMIN D. RITHOLZ.